United States Patent
Jennings

(10) Patent No.: US 7,324,802 B2
(45) Date of Patent: Jan. 29, 2008

(54) METHOD AND SYSTEM FOR MANAGING COMMUNICATION IN EMERGENCY COMMUNICATION SYSTEM

(75) Inventor: Cullen Jennings, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 113 days.

(21) Appl. No.: 11/039,569

(22) Filed: Jan. 20, 2005

(65) Prior Publication Data

US 2006/0160522 A1 Jul. 20, 2006

(51) Int. Cl.
*H04M 11/04* (2006.01)

(52) U.S. Cl. .................................. 455/404.1
(58) Field of Classification Search ............. 455/404.1
See application file for complete search history.

(56) References Cited

U.S. PATENT DOCUMENTS

| | | | | |
|---|---|---|---|---|
| 5,245,332 | A * | 9/1993 | Katzenstein | 340/10.52 |
| 5,740,533 | A * | 4/1998 | Lin | 340/7.42 |
| 5,864,762 | A * | 1/1999 | Childress et al. | 455/509 |
| 6,249,231 | B1 * | 6/2001 | Uchida | 340/7.52 |
| 2005/0170808 | A1 * | 8/2005 | Hamilton | 455/404.1 |
| 2005/0197096 | A1 * | 9/2005 | Yang et al. | 455/404.1 |
| 2005/0215229 | A1 * | 9/2005 | Cheng | 455/404.1 |
| 2005/0233726 | A1 * | 10/2005 | Katsube et al. | 455/404.1 |

OTHER PUBLICATIONS

Arinc, "ARINC Demo Shows How Police, Fire, EMS, and Authorities Can All Communicate" (from ARINC News), Mar. 23, 2004 (Release: Apr. 1966), 2 pages.
(www.911dispatch.com), "Typical Public Safety Comm Centers", updated Sep. 3, 2003, 5 pages.

* cited by examiner

*Primary Examiner*—Lester G. Kincaid
*Assistant Examiner*—Diego Herrera
(74) *Attorney, Agent, or Firm*—Trellis Intellectual Property Law Group, PC

(57) ABSTRACT

A method and system for managing communication in an emergency communication network is described. The emergency communication network receives a plurality of radio messages from a plurality of channels. The incoming radio messages sometimes overlap in time. Incoming radio messages can be prioritized and played back on the basis of the priority and the time of receipt. In case of overlap of the incoming radio messages in time, the radio message with the highest priority is played first, while the remaining radio messages are stored in a queue. The queue is formed again on the basis of priority. The stored radio messages are played subsequent to the completion of the radio message with the higher priority.

21 Claims, 5 Drawing Sheets

METHOD AND SYSTEM FOR MANAGING COMMUNICATION IN EMERGENCY COMMUNICATION SYSTEM

BACKGROUND OF THE INVENTION

1. Field of Invention

This invention relates in general to wireless communication systems. More specifically, the invention relates to methods and systems for managing communication in an emergency communication system.

2. Description of the Background Art

Emergency communication systems are used by emergency service providers such as the fire department, the police force, and hospitals. Each emergency communication system supports a plurality of communication channels, wherein each channel may be dedicated to a group/locality/unit. For example, the fire department can allocate one channel to every school, or other public places such as shopping malls, so as to enable effective communication during an emergency.

This allocation of dedicated channels to different entities results in the possibility of multiple messages being received in the form of radio messages on different channels at one time. The receipt of multiple radio messages at one time creates confusion for an operator who needs to reply/act on each incoming radio message. To avoid this confusion, the operator mutes all the channels except one, so as to clearly follow one channel. This results in the operator being able to follow the channel that is not a muted channel, while the message on the muted channels is lost.

Alternatively, the operator hears overlapping messages. However, in this case, there is a possibility of interference in the overlapping messages, resulting in garbled communication, which may not be of any use. In such a situation, no message being communicated can be used or retrieved.

Hence, conventional techniques are unable to effectively manage the messages being received in all the situations in an emergency communication system. Additionally, the absence of prioritization of incoming data results in the loss of messages.

SUMMARY OF EMBODIMENTS OF THE INVENTION

Various embodiments of the invention provide for storing and replaying audio or other emergency radio communication information so that information that would be obscured or otherwise unheard can be made intelligible to a listener. For example, if incoming radio messages overlap in time the message audio portions can be prioritized and played back on the basis of the priority and the time of receipt. In case of overlap of the incoming radio messages in time, the radio message with the highest priority is played first, while the remaining radio messages are stored in a queue. The queue is formed again on the basis of priority. The stored radio messages are played subsequent to the completion of the radio message with the higher priority. Selection, storing and playback of audio segments can be wholly automated or can be directed with attention to user settings and controls. Other features are provided.

In one embodiment, the invention provides a method of managing communication in an emergency communication system. The emergency communication system receives radio messages from a plurality of channels. The method comprises (i) receiving a first radio message on a first channel from amongst the plurality of channels; (ii) receiving at least one second radio message on channels other than the first channel from amongst the plurality of channels, wherein the second radio message overlaps with the first radio message in time; (iii) playing the radio message with a higher priority between the first and second radio message; (iv) storing at least one radio message with a lower priority between the first and second radio message; and (v) playing the stored radio message subsequent to the completion of the playing of the radio message with the higher priority.

In another embodiment, the invention provides an emergency communication system for managing communication. The emergency communication system receives radio messages from a plurality of channels. The emergency communication system comprises (i) a receiver module for receiving a plurality of radio messages on the plurality of channels, (ii) a player module for playing a received radio message with the highest priority, (iii) a central conferencing system that comprises: (a) a prioritizing module for prioritizing the received plurality of radio messages based on a predefined parameter; (b) a sender module for sending a radio message for playing, based on the associated priority; and (c) a storage medium for storing the radio messages in a queue, based on the associated priority.

In yet another embodiment, the invention provides an apparatus for managing communication in an emergency communication system. The emergency communication system receives radio messages on a plurality of channels. The apparatus comprises (i) a processing system including a processor coupled to a display and user input device; (ii) a machine-readable medium, including instructions executable by the processor comprising (a) one or more instructions for receiving a first radio message on a first channel from amongst the plurality of channels; (b) one or more instructions for receiving at least one second radio message on a second channel from amongst the plurality of channels, the second radio message overlapping with the first radio message in time; (c) one or more instructions for playing the radio message with the highest priority, the priority of the received radio messages being determined, based on at least one predefined parameter; (d) one or more instructions for storing at least one radio message with a lower priority; and (e) one or more instructions for playing the stored radio message subsequent to the completion of the playing of the radio message with a higher priority.

In further embodiments, the invention provides a central conferencing system for managing a plurality of radio messages received by an emergency communication system. The emergency communication system receives the radio messages on a plurality of channels and comprises a player for playing the radio messages. The central conferencing system comprises: (i) a prioritizing module for prioritizing the received radio messages, based on at least one predefined parameter; (ii) a sender module for sending the radio message with the highest priority to the player for playing; (iii) a storage module for storing the radio messages from amongst the plurality of radio messages that are not being played; and (iv) an alert module to inform a user regarding the time of receipt of a radio message, while playing the radio message.

In further embodiments, the invention provides a machine-readable medium, including instructions executable by the processor comprising: (i) one or more instructions for receiving a first radio message on a first channel from amongst the plurality of channels; (ii) one or more instructions for receiving at least one second radio message on a second channel from amongst the plurality of channels, wherein the second radio message overlaps with the first radio message in time; (iii) one or more instructions for playing the radio message with the highest priority, the priority of the received radio message being determined, based on at least one predefined parameter, (iv) one or more instructions for storing at least one radio message with a lower priority; and (v) one or more instructions for playing the stored radio messages subsequent to completing the playing of the radio message with the higher priority.

These provisions, together with the various ancillary provisions and features that will become apparent to those skilled in the art, as the following description proceeds, are attained by devices, assemblies, systems, and methods of embodiments of the invention, the various embodiments thereof being shown with reference to the accompanying drawings, by way of example only, wherein:

DETAILED DESCRIPTION OF EMBODIMENTS OF THE INVENTION

The invention provides methods, systems and a computer program product for managing communication in an emergency communication system. The emergency communication system is a dedicated system used by emergency service providers, handling emergency cases relating to fire, police and hospitals. The emergency communication system has to be reliable and should provide expeditious means for communication during an emergency. The invention provides methods, systems and a computer program product to enable effective communication during an emergency so that each communication packet of radio message is delivered to its destination without any loss of information.

Figure 1:
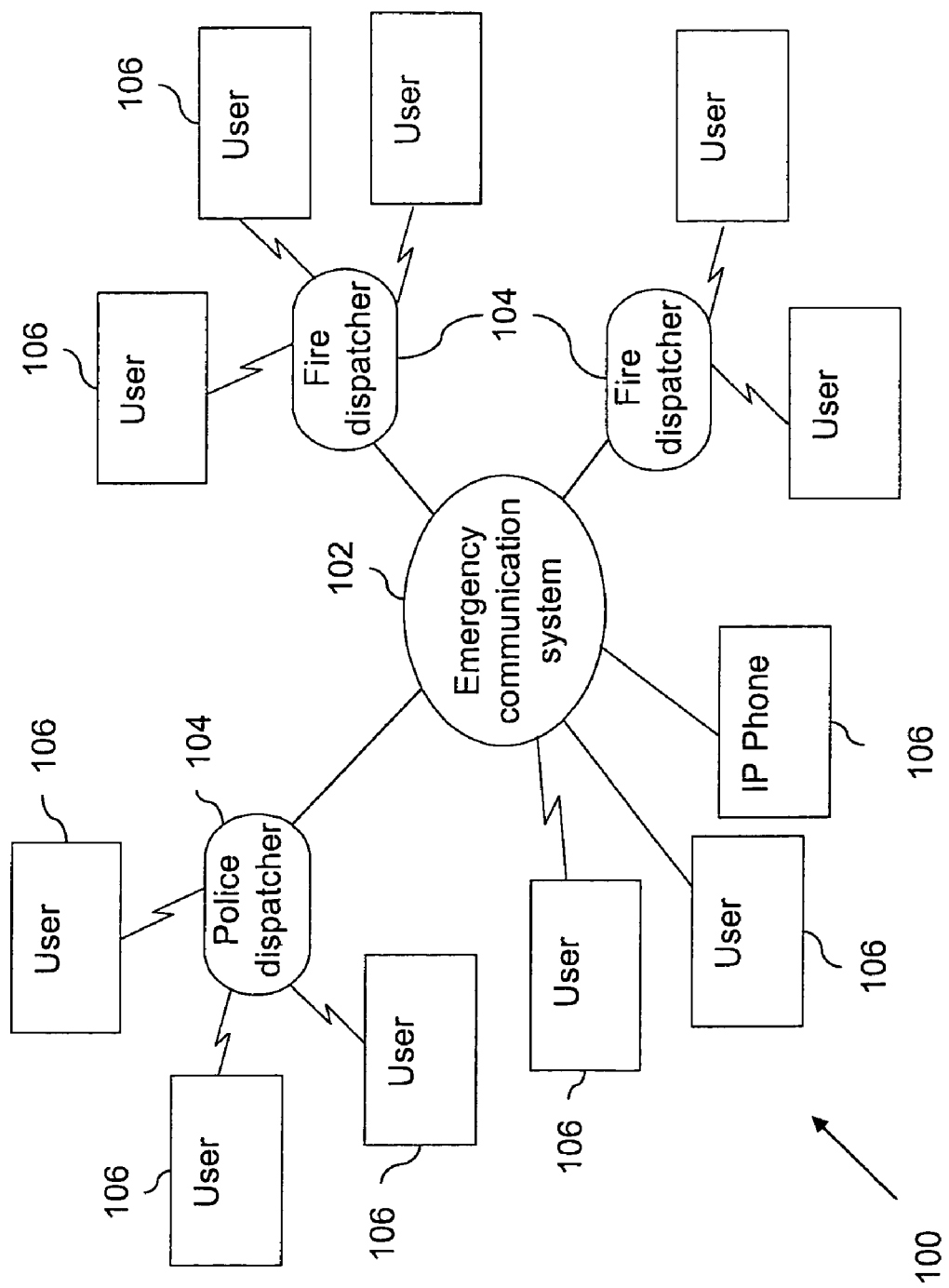
FIG. 1 illustrates an exemplary environment in which the invention operates, in accordance with an embodiment of the invention.

FIG. 1 illustrates an exemplary environment in which the invention operates, in accordance with an exemplary embodiment of the invention. In accordance with an embodiment of the invention, an emergency communication system 102 is connected to dispatchers 104 belonging to the emergency teams. Emergency communication system 102 includes a communication sub-system for sending and receiving messages. Dispatchers 104 are the operators who handle the communication for the emergency teams and respond to emergency messages received from a plurality of users 106. Emergency communication system 102 receives messages on a plurality of communication channels. The connection of emergency communication system 102 with plurality of users 106 can be a wired or wireless connection and may not be bounded by any geographical constraints. The messages can be received from users 106 from any suitable link or device, or in any suitable format such as via wireless devices, the Internet, Voice-over-IP (VoIP), telephones, or any other communication device. The data type of the messages can be, for example, text, audio or video format.

In various embodiments of the invention, a plurality of radio messages is simultaneously received by emergency communication system 102 from separate users 106. The simultaneous receipt of the plurality of radio messages results in the radio messages overlapping in time. The overlapping of radio messages in time results in loss of a part of the radio messages due to interference in incoming radio messages or the manual muting of the radio channels.

In such cases, the invention avoids loss of the radio messages by enabling an appropriate coordination between the various channels communicating the radio messages. In particular, emergency communication system 102 plays a single radio message at one time and stores the remaining radio messages, thereby avoiding loss of the remaining radio messages. In various embodiments of the invention, emergency communication system 102 resolves the overlap of radio messages, based upon a predefined priority. The radio message with the highest priority is played and the remaining radio messages are stored in a queue, based on their priority. The stored radio messages are subsequently played.

Figure 2:
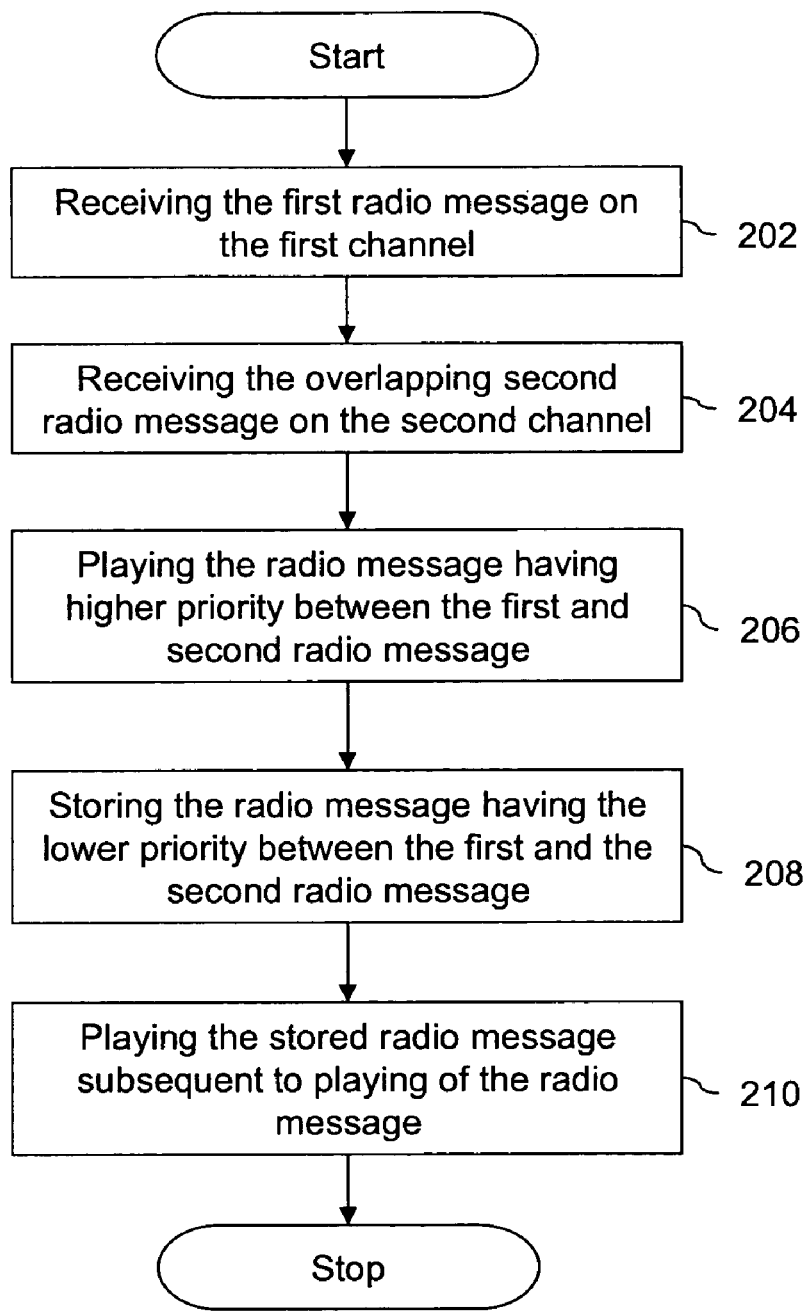
FIG. 2 illustrates a flowchart depicting an overview of a method for managing communication in an emergency communication system, in accordance with an embodiment of the invention.

FIG. 2 illustrates a flowchart depicting an overview of a method for managing communication in an emergency communication system, in accordance with an embodiment of the invention. At step 202, first radio message is received on a first radio channel. At step 204, second radio message is received on a second radio channel. The second radio message overlaps with the first radio message in time. At step 206, the radio message with the higher priority between the first and second radio messages is played. At step 208, the radio message with the lower priority between the first and second radio messages is stored. At step 210, stored radio message is played when no is being played, or when the radio message being played is lower in priority than the stored radio message.

Figure 3:
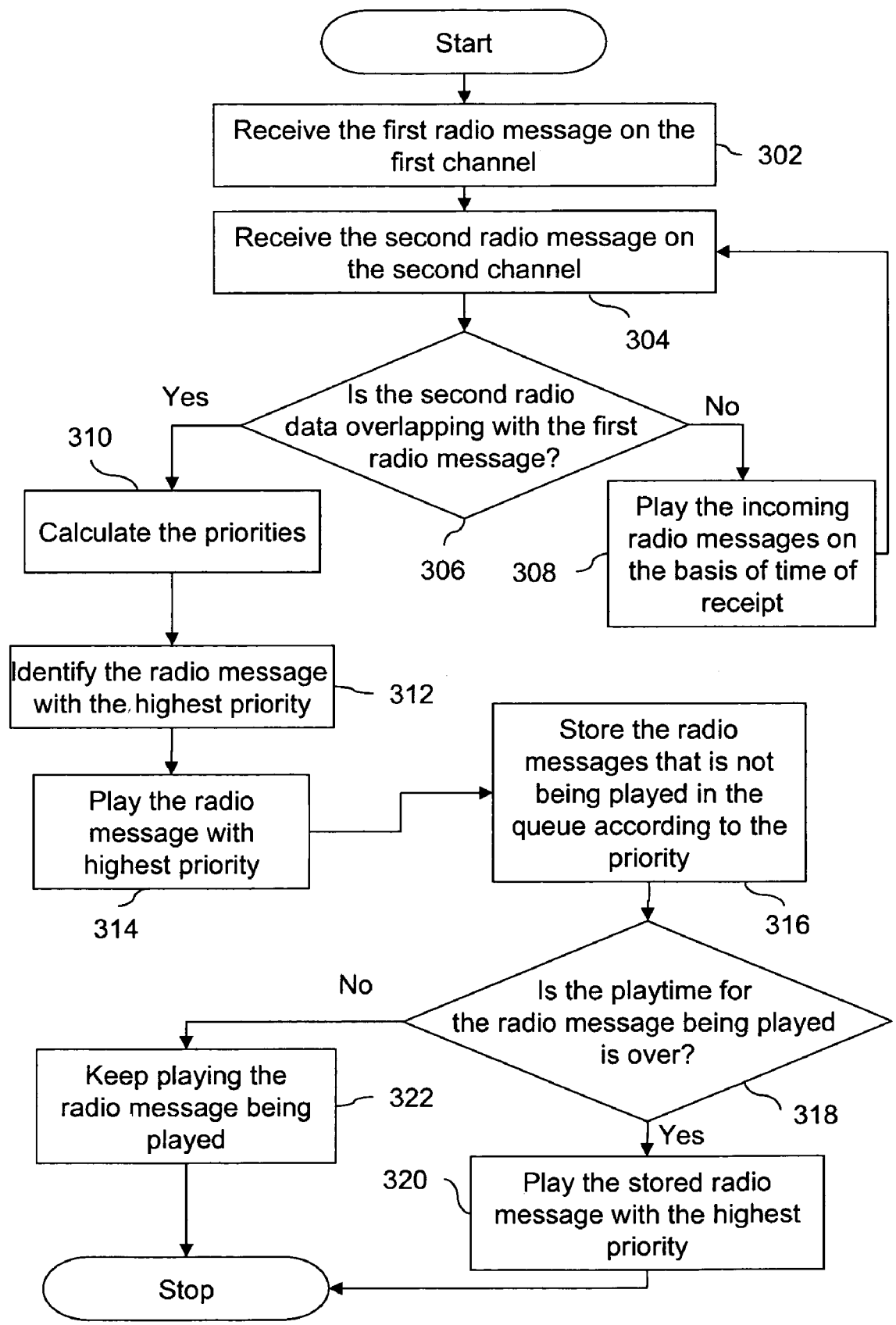
FIG. 3 illustrates a flowchart depicting a detailed method for managing communication in an emergency communication system, in accordance with an embodiment of the invention.

FIG. 3 illustrates a flowchart depicting a detailed method for managing communication in emergency communication system 102, in accordance with an embodiment of the invention. At step 302, emergency communication system 102 receives a first radio message on a first channel. At step 304, emergency communication system 102 receives at least one second radio message on channels other than the first channel. At step 306, a check is performed to verify if the second radio message overlaps with the first radio message in time. If no overlapping has been identified between the first and second radio messages, each of the received radio message is played, based on the time of receipt, as shown at step 308.

However, in case overlapping is identified at step 306, step 310 is performed. At step 310, a priority is calculated for each of the incoming radio messages. In accordance with an embodiment of the invention, the priority can be calculated by using at least one pre-defined parameter. The pre-defined parameter can be, for example, the type of radio messages, the size of the radio messages, the bandwidth requirement, the channel from which radio messages are received, or any possible combination thereof. At step 312, a check is performed to identify the radio message with the highest priority. The radio message with the highest priority is played at step 314 while the remaining radio messages are stored in a queue at step 316. The storage is based on the priority calculated at step 310.

While the radio message with the highest priority is being played, a periodic check is performed at step 318 to verify if the playtime of the radio message with the higher priority is over. In case the playtime for the highest priority radio message is over, step 320 is performed. At step 320, the stored radio message with the highest priority is played. In case the play time for the radio message with the highest priority is not over, the playing of the radio message is continued, as shown at step 322.

However, in case a new radio message is received on any of the plurality of channels, while the radio message with the highest priority is being played, steps 302 to 316 are performed. According to these steps, new radio message is played, in case the priority of the new received radio message is higher than the one being played. Otherwise, the new radio message is stored in the queue and played, based on the priority, once the playtime of the radio message being played is over.

Figure 4:
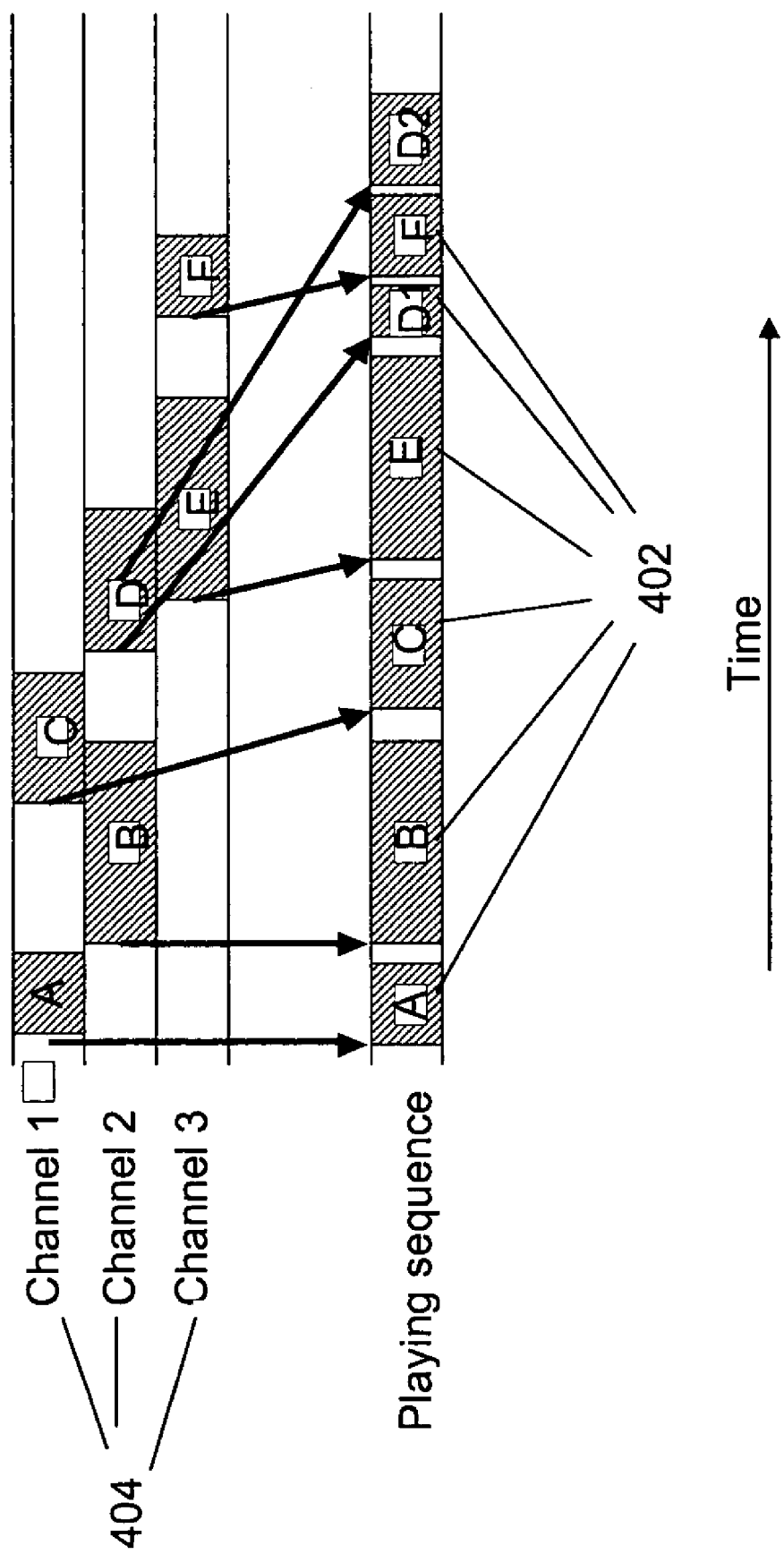
FIG. 4 illustrates a working example of the emergency communication system in case of the receipt of radio messages overlapping in time, in accordance with an embodiment of the invention.

FIG. 4 illustrates a working example of communication by using emergency communication system 102, in accordance with an embodiment of the invention. In accordance with an embodiment of the invention, radio messages 402, in the form of data packets are routed to emergency communication system 102 through a plurality of channels 404. As shown in FIG. 4, the x-axis corresponds to time. Hence, overlapping on the x-axis corresponds to an overlap in time. The first incoming radio message packet is A, followed by B, C, D, E and F. Each radio message packet has an associated priority assigned to it on the basis of at least one of the pre-defined parameters, as described earlier in conjunction with FIG. 3. Each radio message 402 is received on a particular channel, which is supported by emergency communication system 102.

In accordance with an embodiment of the invention, radio message A is played as soon as it is received on channel 1. Thereafter, radio message B is played since it does not overlap in time with radio message A. While radio message B is being played, radio message C is received. After computation and comparison of the priorities of B and C, it is found that the priority of radio message B is higher. Hence, radio message C is stored in the queue. At this point of time, radio message C is the only radio message in the queue. As soon as radio message B is completed, radio message C is played. While radio message C is being played, radio messages D and E are received. Radio messages D and E are lower in priority than radio message C, so they are stored in the queue, based on the priority. In accordance with an embodiment of the invention, the priority of radio message E is higher than that of radio message D, and hence, is stored accordingly in the queue. As soon as radio message C is completed, stored radio message E is played, since it is highest in priority among the stored radio messages. Radio message D is still in the queue. As soon as radio message E is completed, stored radio message D is played. However, while playing radio message D, radio message F is received. Radio message F is found to be higher in priority than radio message D, which is being played. Therefore, the playing of radio message D is terminated after a portion of D, i.e., D1, has been played and radio message F is played. The part of the radio message D that could not be played, i.e., D2, is resumed after the completion of the playing of radio message F. In accordance with an embodiment of the invention, a user is informed about the time of receipt of a radio message, while playing the radio message.

Figure 5:
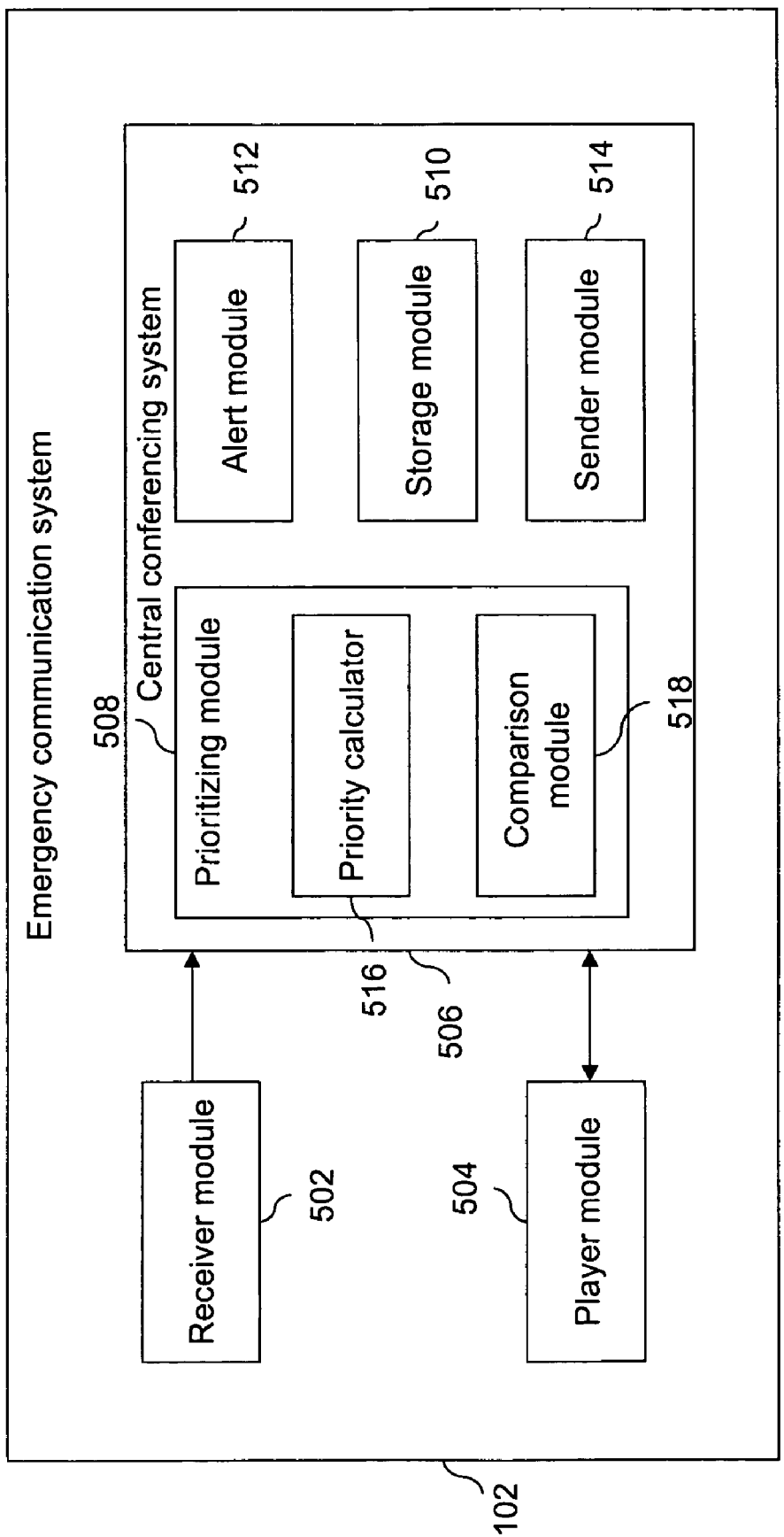
FIG. 5 depicts an emergency communication system, in accordance with an embodiment of the invention.

FIG. 5 depicts an emergency communication system, in accordance with an exemplary embodiment of the invention. In accordance with an embodiment of the invention, an emergency communication system comprises a receiver module 502, a player module 504, and a central conferencing system 506. Receiver module 502 receives the radio messages from plurality of channels 404. In various embodiments of the invention, receiver module 502 is a radio receiver.

Central conferencing system 506 manages the incoming messages and avoids any losses in the messages due to overlap in time. Central conferencing system 506 further includes a prioritizing module 508, a storage module 510, an alert module 512, and a sender module 514. Prioritizing module 508 prioritizes the incoming messages, based on at least one of the pre-defined parameters, as stated above. Prioritizing module 508 further includes a priority calculator 516 and a comparison module 518. Priority calculator 516 calculates the priority of each of the received radio messages. Comparison module 518 compares the priorities of the incoming radio messages, to identify the radio message with the highest priority. The identified radio message is played while the remaining received radio messages are stored in storage module 510 in a queue. The queue is also based on the priority of the radio messages being stored. In an embodiment of the invention, comparison module 518 can be a software module. In another embodiment of the invention, comparison module 518 can be a hardware module such as a comparator circuit.

This storage prevents any losses in the radio messages due to overlapping of messages in time. In various embodiments, storage module 510 can be a memory device such as a random access memory, read only memory, hard disk, and optical storage device. Alert module 512 generates alerts to inform the operator about the time of receipt of a radio message while playing radio message. The alerts can be in the form of audio, video, or as text display. Sender module 514 sends the radio messages for playing. The inputs to sender module 514 come from comparison module 518.

In an embodiment of the invention, central conferencing system 506 includes a computer in which various modules reside. The computer includes a processor, a display unit and a memory. The various modules of central conferencing system 506 can be implemented as a software module, hardware modules, or the combination thereof. In an embodiment of the invention, alerts regarding the time receipts are displayed on the display unit of the computer.

Player module 504 plays the radio message that is directly received on the plurality of channels, or is sent by sender module 514. In various embodiments of the invention, player module 504 is implemented as a hardware module. In an embodiment, player module 504 can be an audio player or an audio-video player.

The embodiments of the invention have the advantage that the plurality of radio messages is effectively managed. The invention prevents the loss of radio messages that would otherwise be lost if the operator of a conventional emergency communication system muted one of the channels in the case of overlap in the incoming radio messages. The invention provides a means for pausing and replaying the lower priority message in the case of a clash of incoming radio messages, thereby increasing the reliability of the emergency communication system.

Another advantage of the invention is the prioritizing of the inflow of messages on the basis of pre-defined parameters. This helps in the cases where some channels, such as those related to schools or other public places, are given higher priority than others, such as in vacated places.

Although the invention has been discussed with respect to its specific embodiments, these embodiments are merely illustrative and not restrictive, of the invention. For example, a 'method for managing communication in an emergency communication system' can include any type of analysis, manual or automatic, to anticipate the needs of the emergency communication system. Different embodiments of the invention need not include all steps, components, or functionality provided herein. For example, an embodiment need not use a priority scheme. Communications can be paused, stored and played back according to a round-robin, random, last-in-first-out, first-in-first-out, or any other scheme. The alert function need not be present in all embodiments. Other features can be modified, added or deleted without departing from the scope of the invention.

Although specific protocols have been used to describe embodiments, other embodiments can use other transmission protocols or standards. Use of the terms 'peer', 'client', and 'server' can include any type of device, operation, or other process. The invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the invention, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the invention.

Also in the description herein for embodiments of the invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions that are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the invention.

A 'computer readable medium' for purposes of embodiments of the invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory. The computer readable medium may have suitable instructions for synchronously presenting multiple video program ID streams, such as on a display screen, or for providing for input or presenting in accordance with various embodiments of the invention.

Reference throughout this specification to "one embodiment", "an embodiment", or "a specific embodiment" means that a particular feature, structure, or characteristic described in connection with the embodiment is included in at least one embodiment of the invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the invention may be combined in any suitable manner with one or more other embodiments. It is to be understood that other variations and modifications of the embodiments of the invention described and illustrated herein are possible in light of the teachings herein and are to be considered as part of the spirit and scope of the invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method of managing communication in a communication system, the communication system receiving messages from a plurality of channels, the method comprising:
   receiving a first message on a first dedicated channel from amongst the plurality of channels at the communication system, the plurality of channels being dedicated to different entities, the first dedicated channel being dedicated to receiving messages from a first entity;
   receiving a second message on a second dedicated channel being dedicated to receiving messages from a second entity from amongst the plurality of channels at the communication system, the second message overlapping with the first message in time;
   determining one or more priorities for the first message received on the first dedicated channel from the first entity and the second message received on the second dedicated channel from the second entity based on at least one pre-defined parameter;
   determining which message out of the first message and the second message should be stored and subsequently played based on the second message overlapping with the first message in time and one or more priorities assigned to the first and the second message;
   playing the message having a higher priority between the first and the second message;
   storing at least one message having a lower priority between the first and the second message based on the determination; and
   playing the stored message subsequent to completing playing of the message having higher priority.

2. The method of claim 1, wherein determining which message out of the first message and the second message should be stored and subsequently played comprises:
   calculating the priorities of the received messages; and
   comparing the priorities of the received messages.

3. The method of claim 1, wherein the predefined parameter comprises a bandwidth requirement of the received messages.

4. The method of claim 1, wherein the predefined parameter comprises a type of the received messages.

5. The method of claim 4, wherein the type of received messages being one of a group comprising audio, video, text, and image.

6. The method of claim 1, wherein determining the priority comprises assigning priorities to the first message and the second message based on inputs from a user.

7. The method of claim 1, further comprising informing an operator the time of receipt of a message while playing the first message and the second message.

8. The method of claim 1, wherein a message includes voice over internet protocol communications.

9. The method of claim 1, wherein a message includes mobile phone communications.

10. The method of claim 1, wherein a message includes radio communications.

11. A method of managing communication in a communication system, the communication system receiving messages from a plurality of channels, the method comprising:
   receiving a first message on a first dedicated channel from amongst the plurality of channels at communication system, the plurality of channels being dedicated to different entities, the first dedicated channel being dedicated to receiving messages from a first entity;
   receiving a second message on a second dedicated channel being dedicate to receiving messages from a second entity at the communication system, the second message overlapping with the first message in time;
   prioritizing the first and second messages based on at least one predefined parameter;
   determining which message of the first message and the second message should be stored and subsequently played based on the second message overlapping with the first message in time and one or more priorities assigned to the first and the second message;
   playing the message having the highest priority;
   storing the message having lower priority in a queue on the basis of the determination and the prioritization;
   checking periodically the status of the message being played; and
   playing the stored message having the highest priority.

12. The method of claim 11 further comprising informing a user the time of receipt of a message while plying the message.

13. A communication system for managing communication, the communication system receiving messages from a plurality of channels, the communication system comprising:
   means for receiving a plurality of messages on the plurality of channels, the plurality of messages received including a first message received from a first dedicated channel dedicated to receiving messages from a first entity and a second message received from a second dedicated channel dedicated to receiving messages from a second entity;

means for playing a received messages having the highest priority, the plurality of received messages being prioritized based on at least one predefined parameter;

a central conferencing system comprising:

means for prioritizing the received plurality of messages including the first message from the first dedicated channel and the second message from the second dedicated channel based on the predefined parameter;

means for determining which messages out of the received messages should be stored and subsequently played based on messages overlapping in time and one or more priorities assigned to the first and the second message;

means for sending the messages for playing based on the associate priority; and means for storing the messages other than the one sent for playing in a queue based upon the associated priority.

14. A communication system for managing communication, the communication system receiving messages from a plurality of channels, the communication system comprising:

a receiver module configured to receive a plurality of messages on the plurality of channels, the plurality of messages received including a first message received from a first dedicated channel dedicated to receiving messages from a first entity and a second message received from a second dedicated channel dedicated to receiving messages from a second entity;

a player module for playing a received message having the highest priority, the plurality of received messages being prioritized based on at least one predefined parameter;

a central conferencing system comprising:

a prioritizing module configured to prioritize of messages including the first message received on the first dedicated channel and the second message received on the second dedicated channel based on the predefined parameter;

a determiner configured to determine which messages out of the received messages should be stored and subsequently played based on the second message overlapping with the first message in time and one or more priorities assigned to the first and the second message;

a sender module to send a message for playing based on the associated priority; and a storage medium configured to store the messages in a queue based upon the associated priority and the determination.

15. The communication system of claim 14, wherein the prioritizing module comprises:

a priority calculator for calculating the priority of the received messages; and a comparison module for comparing the priorities of the plurality of received messages.

16. The communication system of claim 14, wherein the central conferencing system further comprises an alert module for informing an operator the time of receipt of a message while playing the message.

17. A central conferencing system for managing a plurality of messages received by a communication system, the central conferencing system comprising:

a receiver module configured to receive a plurality of messages on the plurality of channels, the plurality of messages received including a first message received from a first dedicated channel dedicated to receiving messages from a first entity and a second message received from a second dedicated channel dedicated to receiving message from a second entity;

a prioritizing module for prioritizing the received messages based on at least one predefined parameter, the prioritizing module comprises:

a priority calculator for calculating the priority of the received messages including the first message received on the first dedicated channel and the second message received on the second dedicated channel; and a comparison module for comparing the priorities of the plurality of received messages;

a sender module for sending the messages with the highest priority to the player module for playing;

a determiner configured to determine which messages out of the received messages should be stored and subsequently played based on the second message overlapping with the first message in time and one or more priorities assigned to the first and the second message;

a storage module for storing the messages from amongst the plurality of messages that are not being played; and an alert module for informing a user the time of receipt of a message while playing the message.

18. An apparatus for managing communication in a communication system, the communication system receiving messages on a plurality of channels, the apparatus comprising:

a processing system including a processor coupled to a display and user input device; and a machine-readable medium including instructions executable by the processor comprising:

one or more instructions for receiving a plurality of messages on the plurality of channels, the plurality of messages received including a first message received from a first dedicated channel to receiving messages from a first entity and a second message received from a second dedicated channel dedicated to receiving messages from a second entity;

one or more instructions for playing the message having the highest priority, the priority of the received messages including the first message and the second message being determined based on at least one predefined parameter;

one or more instructions for determining which messages out of the received m messages should be stored and subsequently played based on messages overlapping in time and one or more priorities assigned to the first and the second message;

one or more instructions for playing the stored messages subsequent to completing playing of the message having higher priority.

19. A machine-readable medium including instructions executable by the processor comprising:

one or more instructions for receiving a plurality of messages on the plurality of channels, the plurality of messages received including a first message received from a first dedicated channel dedicated to receiving messages from a first entity and a second message received from a second dedicated channel dedicated to receiving messages from a second entity;

one or more instructions for playing the message having the highest priority, the priority of the received messages being including the first message and the second message being determined based on at least one predefined parameter;
one or more instructions for determining which messages out of the received messages should be stored and subsequently played based on message overlapping in time and one or more priorities assigned to the first and the second message;
one or more instructions for storing at least one message having a lower priority; and
one or more instructions for playing the stored messages subsequent to completing playing of the message having higher priority.

20. The method of claim 1, wherein playing the message comprises playing the message having a higher priority between the first and second message without storing the message having the higher priority if no other message is being played.

21. The method of claim 1, wherein determining the priority comprises determining the priority based on the dedicated channel the first message and/or the second message is received on.

* * * * *